UNITED STATES PATENT OFFICE.

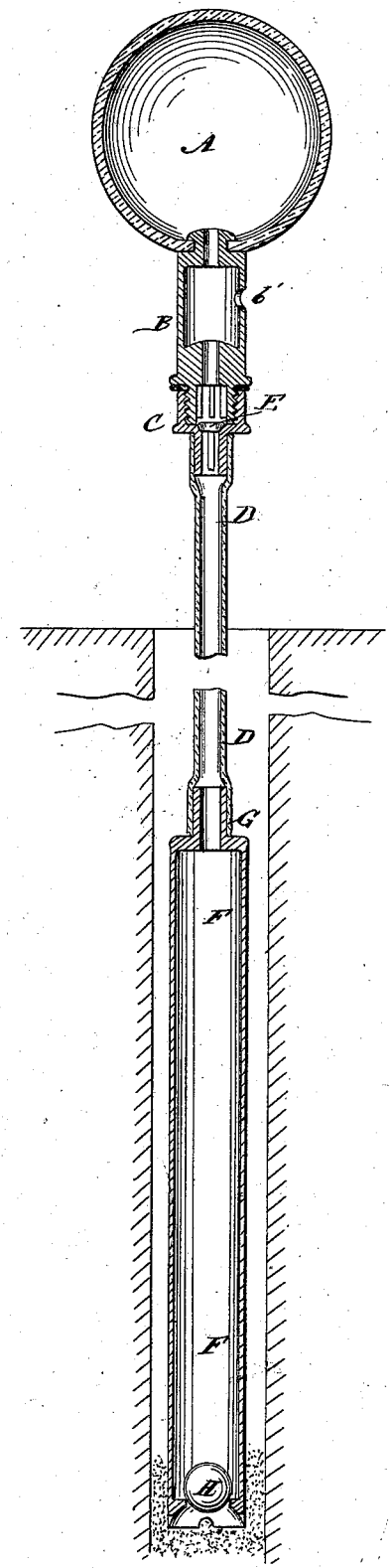

JOSEPH L. PRENTISS, OF CAÑON CITY, COLORADO.

PNEUMATIC DRILL-HOLE CLEANER.

SPECIFICATION forming part of Letters Patent No. 224,558, dated February 17, 1880.

Application filed July 9, 1879.

*To all whom it may concern:*

Be it known that I, JOSEPH LYMAN PRENTISS, of Cañon City, in the county of Fremont and State of Colorado, have invented a new and useful Improvement in Pneumatic Drill-Hole Cleaners, of which the following is a specification.

The figure is a longitudinal section of my improved device.

The object of this invention is to furnish an improved device by means of which the drillings may be easily and quickly removed from drill-holes, and which shall be simple in construction and convenient in use.

The invention consists in the combination of the rubber bulb or equivalent bellows, the connection-piece provided with a hole in its side, the valve, the rubber hose and its coupling, and the metal tube provided with a ball-valve at its lower end, with each other, as hereinafter fully described.

Similar letters of reference indicate corresponding parts.

A represents a rubber bulb four inches (more or less) in diameter, and with which is connected a short tube or connection-piece, B, provided with a hole, $b'$, in its side for the escape of the air when the bulb A is compressed.

In the outer end of the connection-piece B, or in the coupling C that connects the said connection-piece B with the rubber hose D, is placed a valve, E, opening upward. The valve E prevents the air from being forced into and compressed in the rubber hose D and the tube F coupled to it when the bulb A is compressed.

G represents the end of the metal tube reduced in diameter to receive the rubber hose D; or the hose can be connected to the said tube by a coupling, in order that the rubber hose D may be readily detached and replaced with a longer or a shorter one, as the depth of the drill-hole to be cleaned may require.

In the lower end of the tube F is placed a ball-valve, H, as shown in the drawing. The tube F is made of a less diameter than the hole to be cleaned, and its lower edge is notched to allow the drillings to enter the lower end of the said tube readily.

In using the instrument the metal tube F is lowered into the drill-hole until its lower end rests upon and is embedded in the drillings. The bulb A is then compressed, forcing the air out through the hole $b'$. The hole $b'$ is then closed with a finger, and the bulb A is released and allowed to expand, and the atmospheric pressure will force the drillings into the lower end of the tube F to take the place of the air which passes up into the bulb A when the pressure upon the said bulb is removed. By compressing the bulb A two or three times all the drillings will be forced from the drill-hole into the tube F, and the device may then be removed from the drill-hole. The ball H is forced up with a finger and the drillings allowed to flow out.

If desired, the rubber bulb A may be replaced by a bellows suitably formed to produce a vacuum.

Having thus fully described my invention, I claim as new and desire to secure by Letters Patent—

The combination of the rubber bulb A, or equivalent bellows, the connection-piece B, provided with a hole, $b'$, in its side, the valve E, the rubber hose D, the coupling C, and the tube F, provided with a ball-valve, H, at its lower end, with each other, substantially as herein shown and described.

JOSEPH LYMAN PRENTISS.

Witnesses:
WM. L. G. SOULE,
A. F. STOECKLEY.